US012741579B2

(12) United States Patent
Pan et al.

(10) Patent No.: US 12,741,579 B2
(45) Date of Patent: Sep. 22, 2026

(54) DOUBLE DECKER EXPANDABLE STRUCTURE

(71) Applicant: A&C FUTURE, INC., Newport Beach, CA (US)

(72) Inventors: Qiyin Pan, Irvine, CA (US); Jiuqi Wang, Santa Ana, CA (US); Shoue Chen, Irvine, CA (US); Han Qin, Newport Beach, CA (US); Jiayang Qin, Newport Beach, CA (US)

(73) Assignee: A&C FUTURE, INC., Irvine, CA (US)

( * ) Notice: Subject to any disclaimer, the term of this patent is extended or adjusted under 35 U.S.C. 154(b) by 305 days.

(21) Appl. No.: 18/457,518

(22) Filed: Aug. 29, 2023

(65) Prior Publication Data

US 2025/0074288 A1 Mar. 6, 2025

(51) Int. Cl.

| | |
|---|---|
| ***B60P 3/34*** | (2006.01) |
| ***B60P 1/02*** | (2006.01) |
| ***B60P 3/32*** | (2006.01) |
| ***B60P 3/42*** | (2006.01) |
| ***E04B 1/00*** | (2006.01) |
| ***E04B 1/343*** | (2006.01) |

(52) U.S. Cl.

CPC .................. *B60P 3/34* (2013.01); *B60P 3/32* (2013.01); *B60P 1/02* (2013.01); *B60P 3/42* (2013.01); *E04B 1/003* (2013.01); *E04B 1/34305* (2013.01); *E04B 1/3431* (2013.01); *E04B 1/34312* (2023.08)

(58) Field of Classification Search

CPC ...... B60P 3/34; B60P 3/32; B60P 1/02; B60P 3/42; E04B 1/34305; E04B 1/3431; E04B 1/34312; E04B 1/003

See application file for complete search history.

(56) References Cited

U.S. PATENT DOCUMENTS

| | | | | |
|---|---|---|---|---|
| 2,193,352 | A * | 3/1940 | Thomas | B60P 3/34 296/26.05 |
| 2,739,833 | A * | 3/1956 | Schenkel | B60P 3/34 296/26.05 |
| 3,593,471 | A | 7/1971 | Fields | |
| 3,608,954 | A | 9/1971 | Lynd | |
| 3,774,956 | A | 11/1973 | Barlow | |
| 4,165,117 | A * | 8/1979 | Kaiser | B60P 3/34 52/66 |
| 5,374,094 | A | 12/1994 | Smith et al. | |
| 5,967,583 | A | 10/1999 | Wishart | |

(Continued)

*Primary Examiner* — Omar F Hijaz

(74) *Attorney, Agent, or Firm* — INNOVATION CAPITAL LAW; Vic Lin

(57) ABSTRACT

An expandable structure can expand to provide a second story and patio over the first story. The expandable structure can be provided as a recreational vehicle, for example. The second story can recess partially into the first story, while the walls of the second story can be formed in two portions that nest with each other, into the upper portion of the first story, when in the retracted state. During expansion, the second story floor can move upward, into its expanded state location, then the roof can lift, unnesting the walls of the second story to form the second story living space. The patio handrails can automatically deploy as the second story is opened. A sliding door, for example, can provide a passage from the second story living space to the patio.

14 Claims, 13 Drawing Sheets

(56) References Cited

U.S. PATENT DOCUMENTS 6,679,542 B1 * 1/2004 Semotuk ................. B60P 3/341 296/173
6,729,678 B1 5/2004 Atcravi
6,749,252 B2 * 6/2004 Cervenka ................ B60P 3/341 296/165
7,234,759 B1 * 6/2007 Alohali ..................... B60P 3/34 296/26.05
7,644,971 B1 1/2010 Ludwick
7,654,603 B2 * 2/2010 Kealy .................... B60J 7/1614 296/100.08
7,841,645 B2 * 11/2010 Diamond .................. B60P 3/34 296/165
8,267,455 B1 9/2012 Ludwick
9,574,399 B2 * 2/2017 Harber ...................... B60P 3/14
10,538,908 B1 * 1/2020 Wilson .................. B66F 7/0675
10,730,372 B2 * 8/2020 Roth ....................... B60P 1/435
2002/0125736 A1 * 9/2002 Messano ................... B60P 3/34 296/165
2002/0189503 A1 * 12/2002 Hansen ................... B60R 3/005 108/44
2003/0094827 A1 * 5/2003 Faludy ...................... B60P 3/36 296/26.06
2005/0194807 A1 * 9/2005 Gonzalez .................. B60P 1/02 296/26.05
2017/0356204 A1 * 12/2017 Lyons, Jr. ........... E04B 1/34305
2018/0079348 A1 3/2018 Ronsen
2019/0345730 A1 * 11/2019 Tafuro ................ E04B 1/34305
2024/0254754 A1 * 8/2024 Zhou ..................... E04B 1/3444

* cited by examiner 30
32
46

32
40
44
46

42
40
42
44

42
40
42
44

DOUBLE DECKER EXPANDABLE STRUCTURE

BACKGROUND OF THE INVENTION

1. Field of the Invention

Embodiments of the invention relate generally to expandable homes. More particularly, embodiments of the invention relate to a mobile house or recreational vehicle that can be expanded upward to create a second story living space.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

An expandable moveable house structure is gaining in popularity in recent years. In most expandable house designs, there are few with a second floor. A mobile house or recreational vehicle are both developed to be expandable. Typically, such structures include one or more slide outs that can slide outward from the main structure to expand the living space. Often, expansion may occur on one side of the main structure, while some such mobile structures may expand on opposing sides.

In view of the foregoing, there is a need for an expandable house that can expand upward, to increase living space.

SUMMARY OF THE INVENTION

Embodiments of the present invention aim to solve the aforementioned problems in conventional expandable homes. Embodiments of the present invention include some mechanisms to let the house expand upward to create a second story living space. This provides greater flexibility of indoor design and people will enjoy a larger space with the same original area.

Embodiments of the present invention provide an expandable structure transformable between a collapsed state and an expanded state, the expandable structure comprising a main structure; and an expansion section expandable upward from at least a portion of the main structure to form a second story above a first story of the main structure, wherein the expansion section including a lower wall section and an upper wall section, the lower wall section nesting with the upper wall section when the expansion section is retracted, and the lower wall section and the upper wall section forms exterior walls of the expansion section when the expansion section is fully expanded.

Embodiments of the present invention provide an expandable structure transformable between a collapsed state and an expanded state, the expandable structure comprising a main structure; an expansion section expandable upward from at least a portion of the main structure to form a second story above a first story of the main structure; and a patio deck formed over a portion of the main structure, wherein the second story is adjacent the patio deck when the expandable structure is in the expanded state, wherein the expansion section including a lower wall section and an upper wall section, the lower wall section nesting with the upper wall section when the expansion section is retracted, the lower wall section and the upper wall section both nesting within exterior walls of the main structure; and the lower wall section and the upper wall section forms exterior walls of the expansion section when the expansion section is fully expanded.

Embodiments of the present invention provide an expandable structure transformable between a collapsed state and an expanded state, the expandable structure comprising a main structure; an expansion section expandable upward from at least a portion of the main structure to form a second story above a first story of the main structure; and a lifting mechanism operable to raise the lower wall section and the upper wall section from a collapsed position within the main structure, wherein the expansion section including a lower wall section and an upper wall section, the lower wall section nesting with the upper wall section when the expansion section is retracted, the lower wall section and the upper wall section both nesting within exterior walls of the main structure; the lifting mechanism includes a first lifting mechanism lifts the lower wall section and the upper wall section, simultaneously, into a first raised position, where the lower wall portion forms an exterior wall of the second story, and the upper wall portion is nested inside the lower wall portion; and the lifting mechanism includes a second lifting mechanism lifts the upper wall section into a second raised position, where the second wall portion forms a portion of the exterior wall of the second story.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
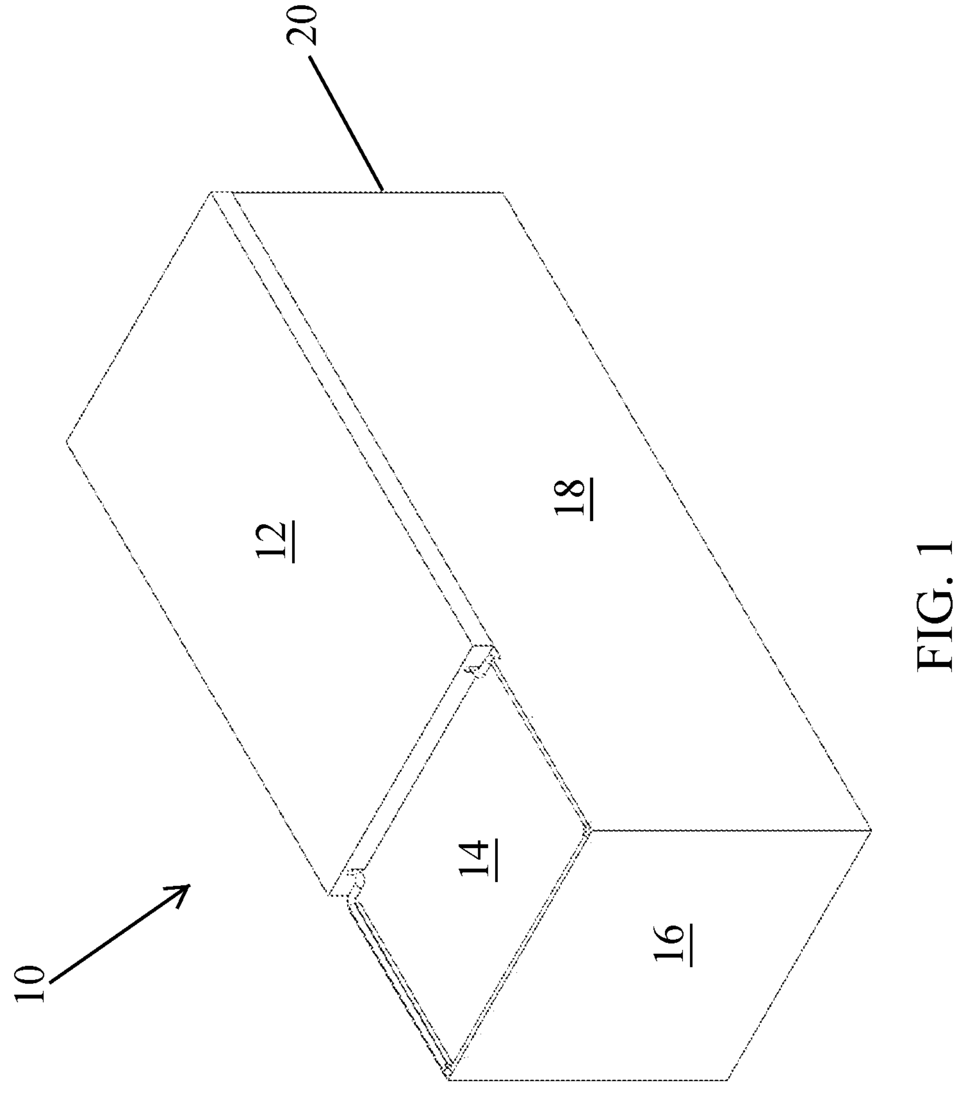
FIG. 1 illustrates a perspective view of an expandable structure, in a closed state, according to an exemplary embodiment of the present invention.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an expandable structure that can expand to provide a second story and patio over the first story. The expandable structure can be provided as a recreational vehicle, for example. The second story can recess partially into the first story, while the walls of the second story can be formed in two portions that nest with each other, into the upper portion of the first story, when in the retracted state. During expansion, the second story floor can move upward, into its expanded state location, then the roof can lift, unnesting the walls of the second story to form the second story living space. The patio handrails can automatically deploy as the second story is opened. A sliding door, for example, can provide a passage from the second story living space to the patio.

Referring to FIGS. 1 through 4, an expandable structure 10 can include a roof 12, a patio deck 14, a front face 16, a rear wall 20 and side walls 18. The front face 16 may be closed or may be open (via an opening, a door, or the like) to passenger and driver's seats, such as when the expandable structure 10 may be incorporated into a recreational vehicle. The front face 16 and the rear wall 20 may be switched, so that the patio deck 14 is at the rear instead of the front of the expandable structure 10.

Figure 2:
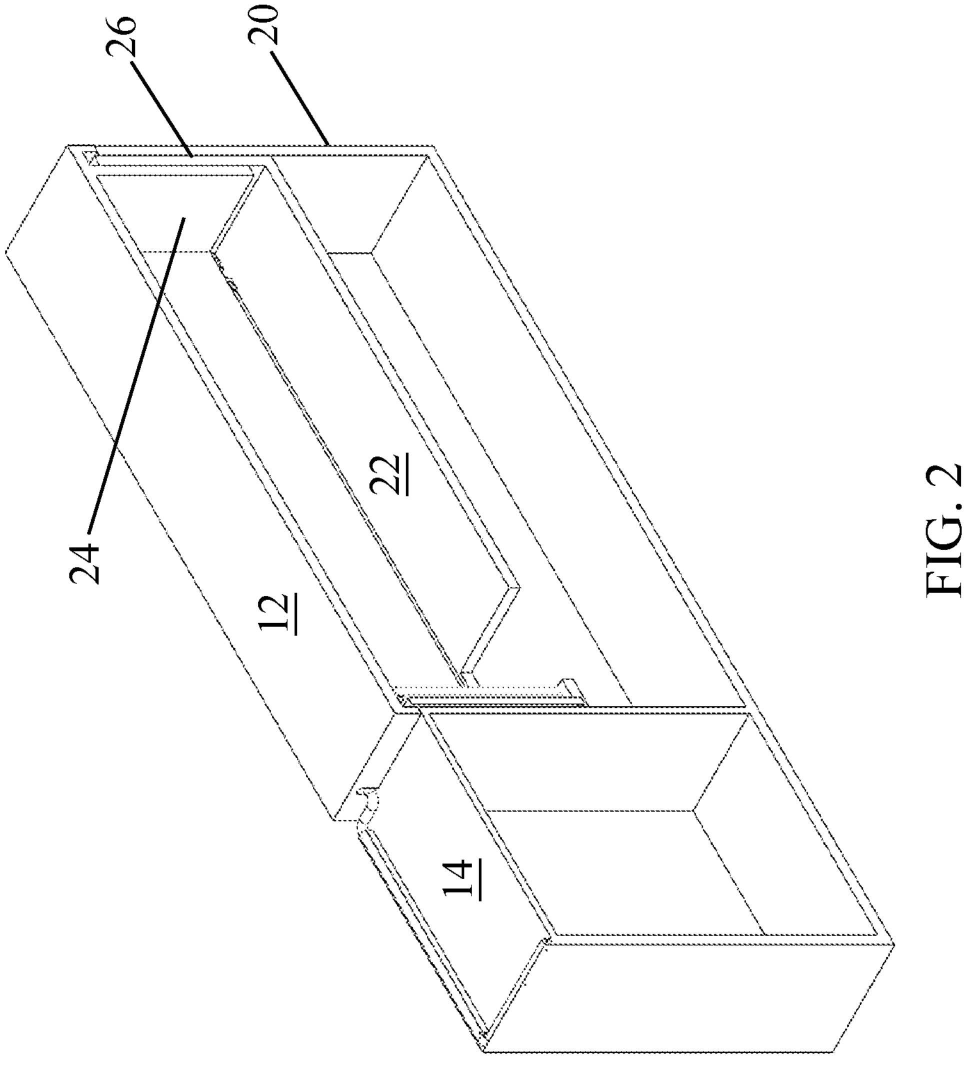
FIG. 2 illustrates a cross-sectional perspective view of the expandable structure of FIG. 1.
Figure 3:
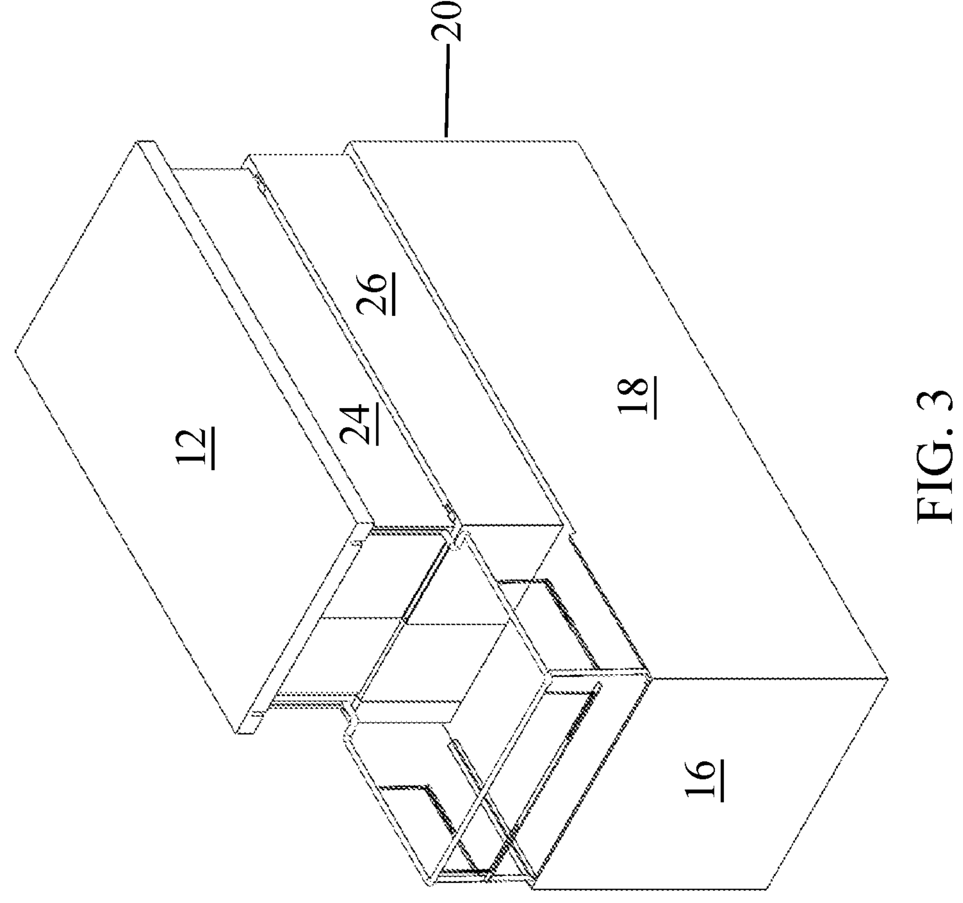
FIG. 3 illustrates a perspective view of the expandable structure of FIG. 1 in an expanded state.

In the retracted state, as best shown in FIG. 2, a floor structure 22 for the second story 13 can be positioned partway down into the first story 11. Typically, the floor structure 22 may be about one-third to half way down into the first story 11, as can be seen in FIG. 2. The walls may be formed from an outer wall (such as rear wall 20). Inside the rear wall 20, the rear upper wall 24 and the rear lower wall 26 of the expansion section (second story 13) are nested together. A similar structure is provided for the front and side walls of the second story 13.

Figure 4:
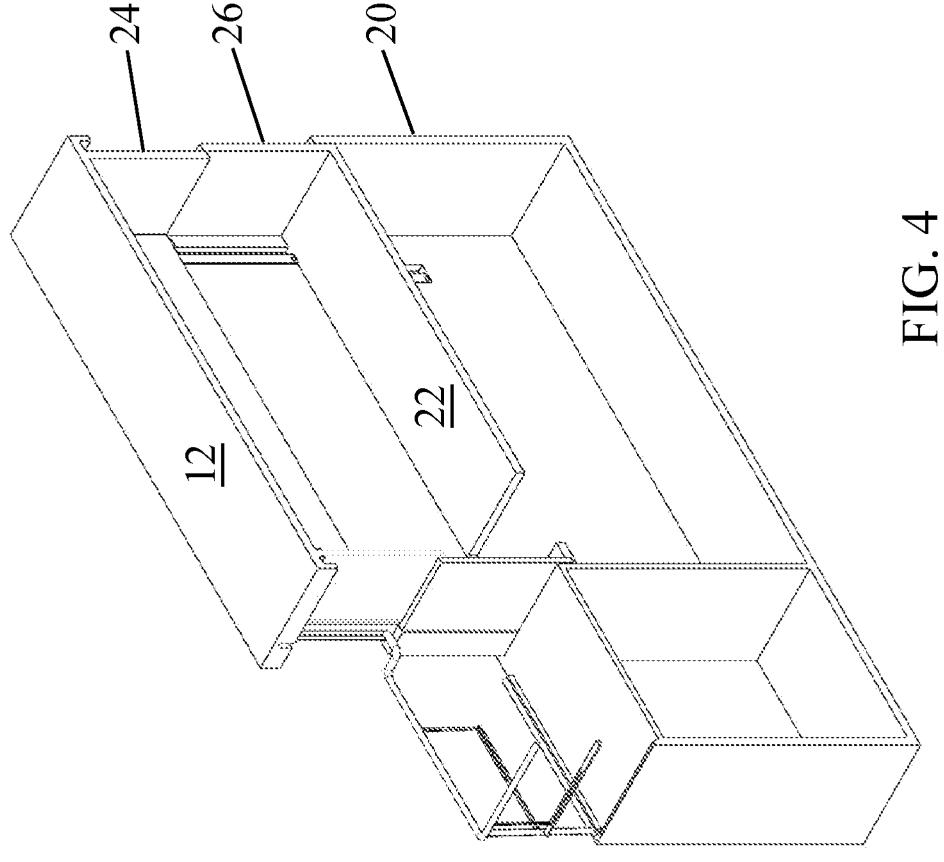
FIG. 4 illustrates a cross-sectional perspective view of the expandable structure of FIG. 3.

Once expanded, as best seen in FIG. 4, the upper rear wall 24 and the lower rear wall 26 form the outer wall of the second story 13. The floor surface 22 is shown in the expanded state in FIG. 4, positioned as a second story floor for the living space of the second story 13.

Figure 5A:
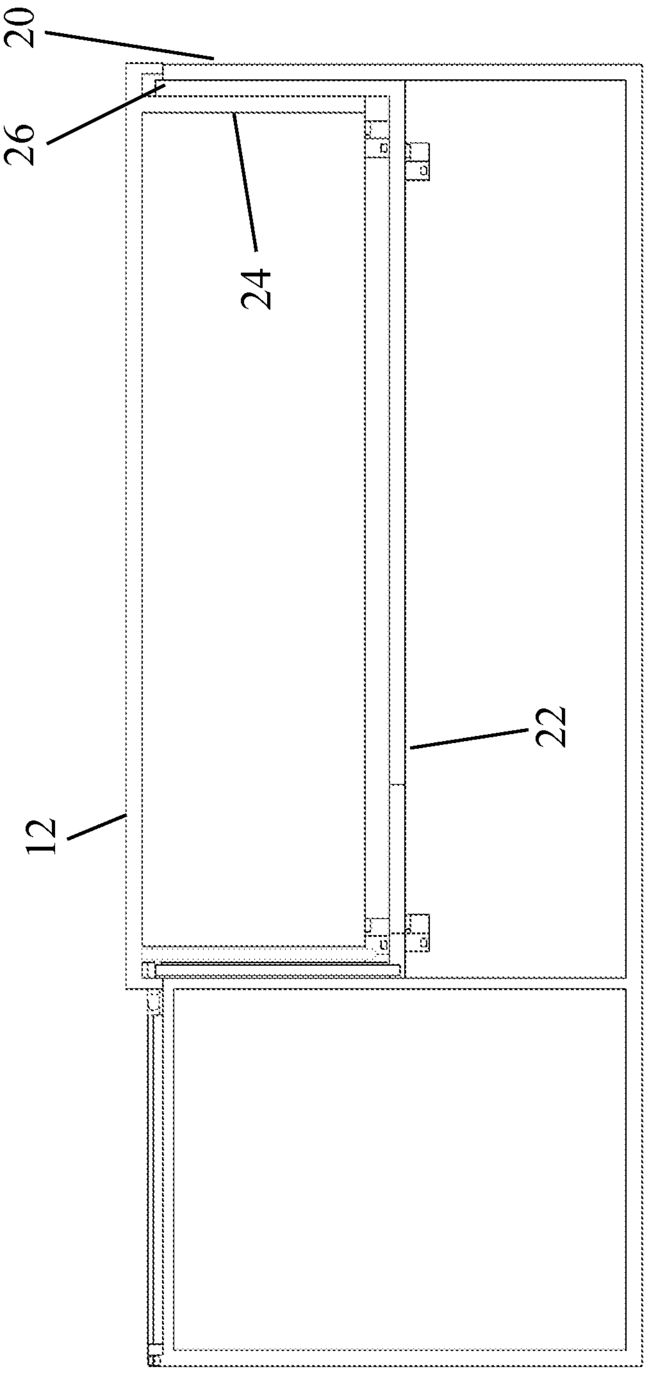
FIGS. 5A through 5D illustrate cross-sectional side views of the expandable structure of FIG. 1, during expansion thereof.
Figure 5B:
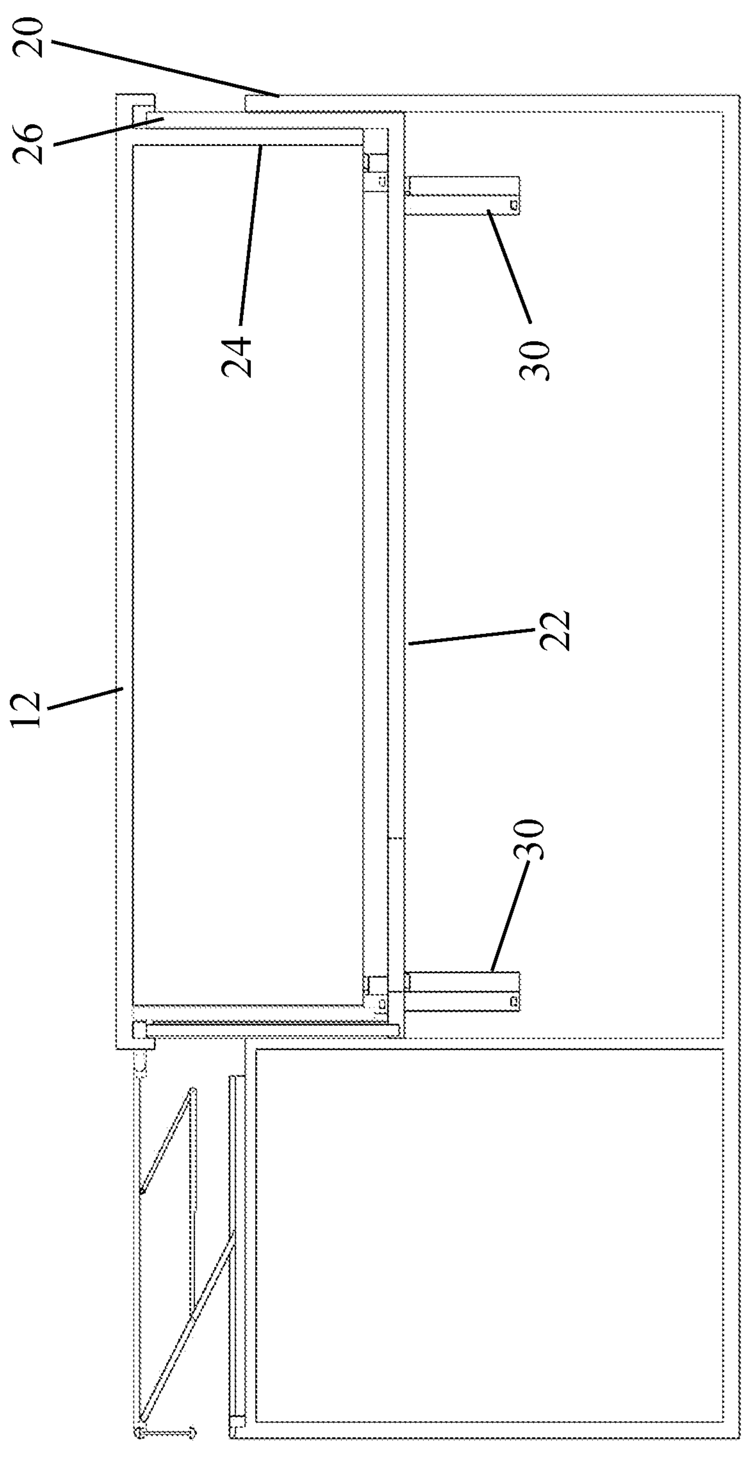
Figure 5C:
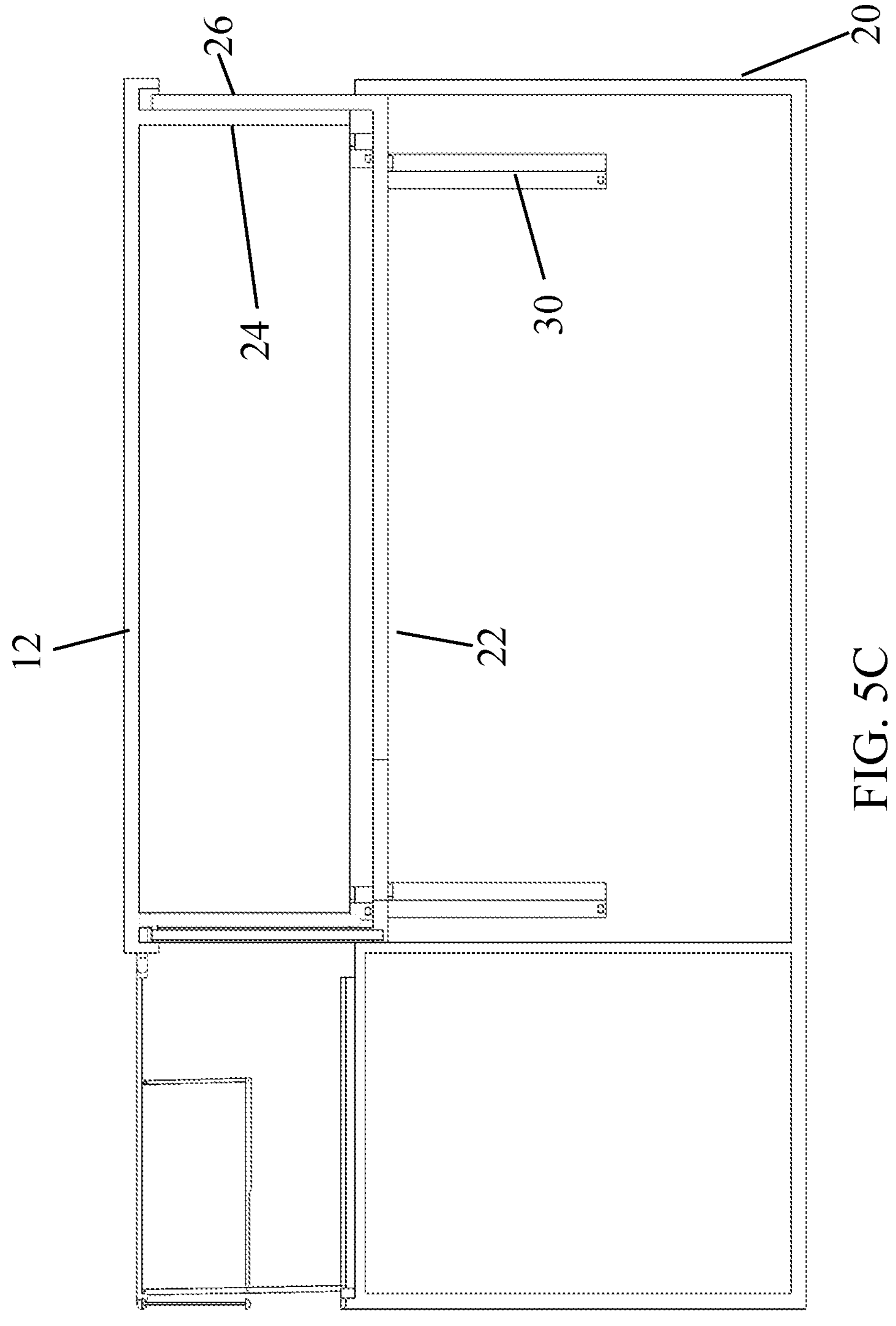
Figure 5D:
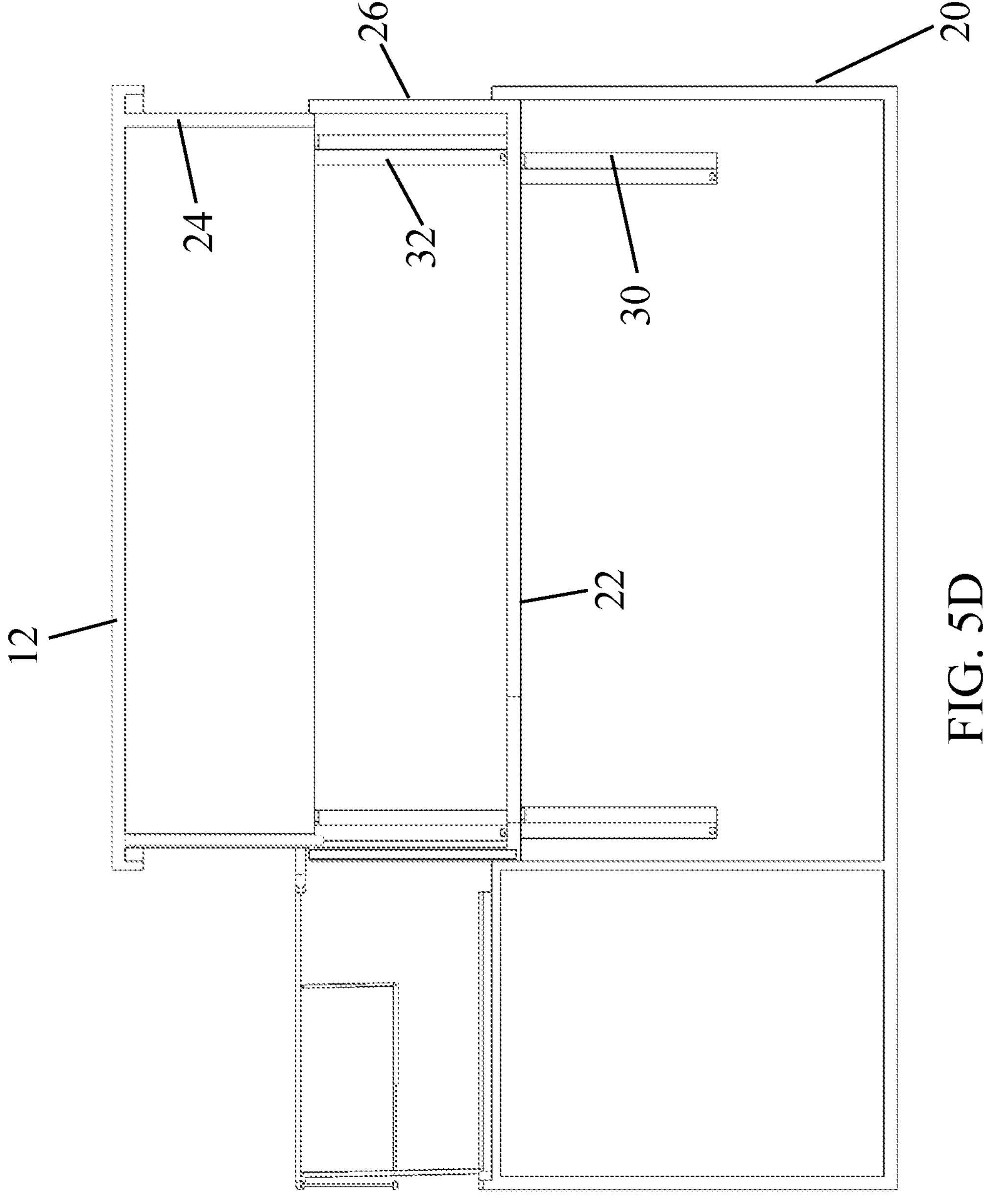
Figures 6A, 6B, 6C:
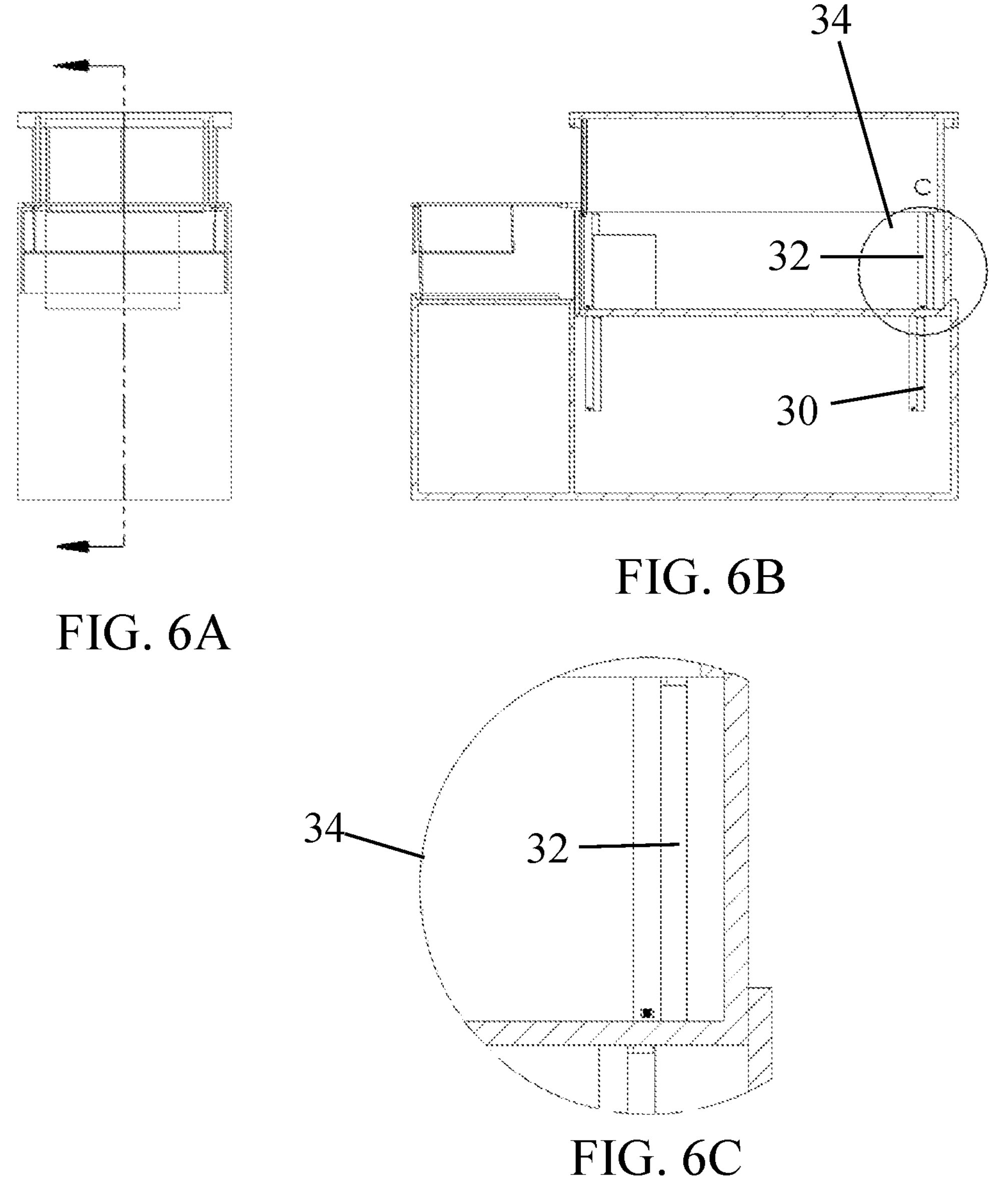
FIGS. 6A through 6C illustrates views of the lifting mechanism within the expandable structure of FIG. 1.
Figures 7A, 7B, 7C, 7D:
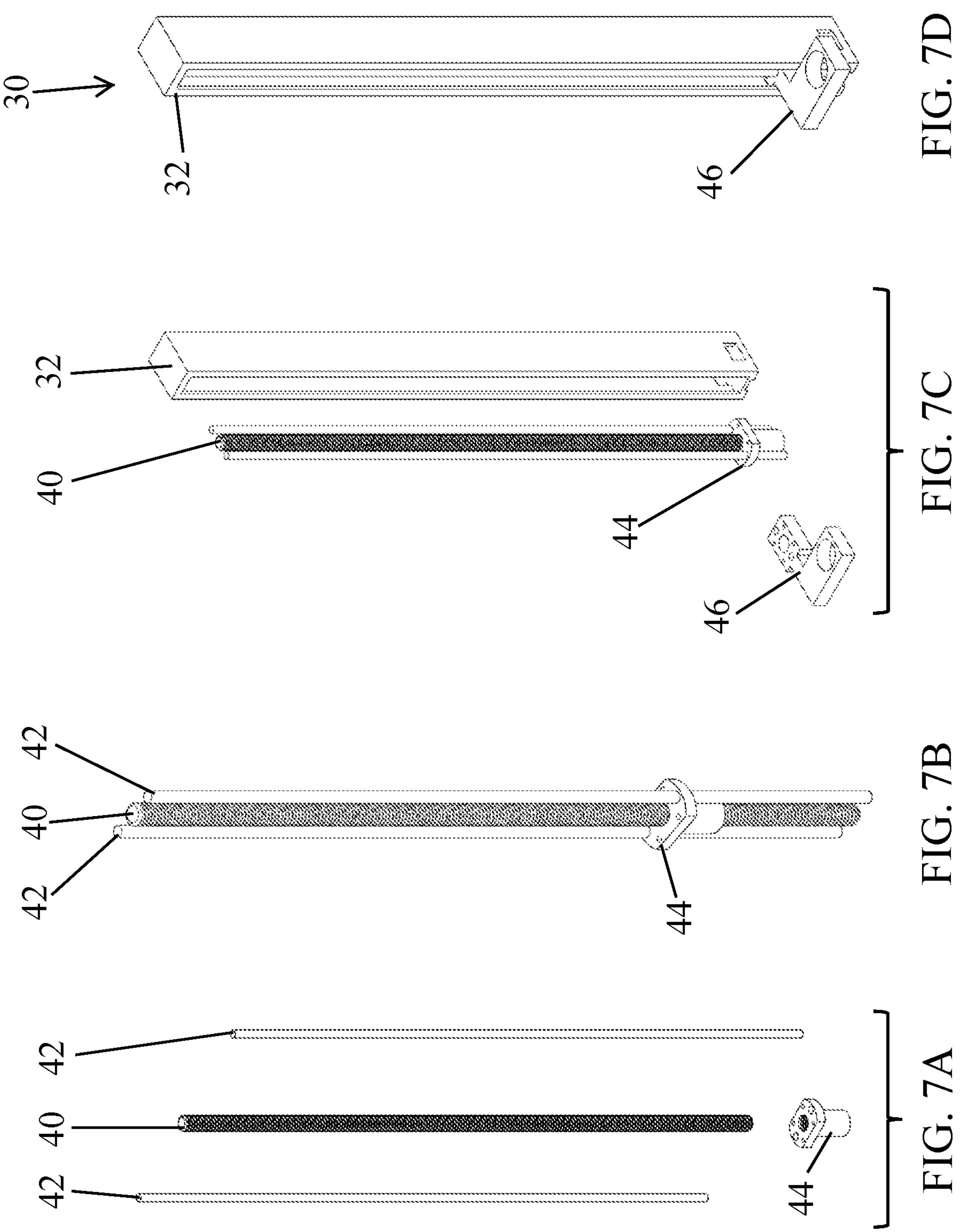
FIG. 7A illustrates an exploded view of a lifting mechanism according to an exemplary embodiment of the present invention.
FIG. 7B illustrates an assembled view of the lifting mechanism of FIG. 7A.
FIG. 7C illustrates an exploded view of the lifting mechanism of FIG. 7A, along with a housing and a lifting adapter.
FIG. 7D illustrates an assembled view of the mechanism of FIG. 7C.
Figures 8A, 8B:
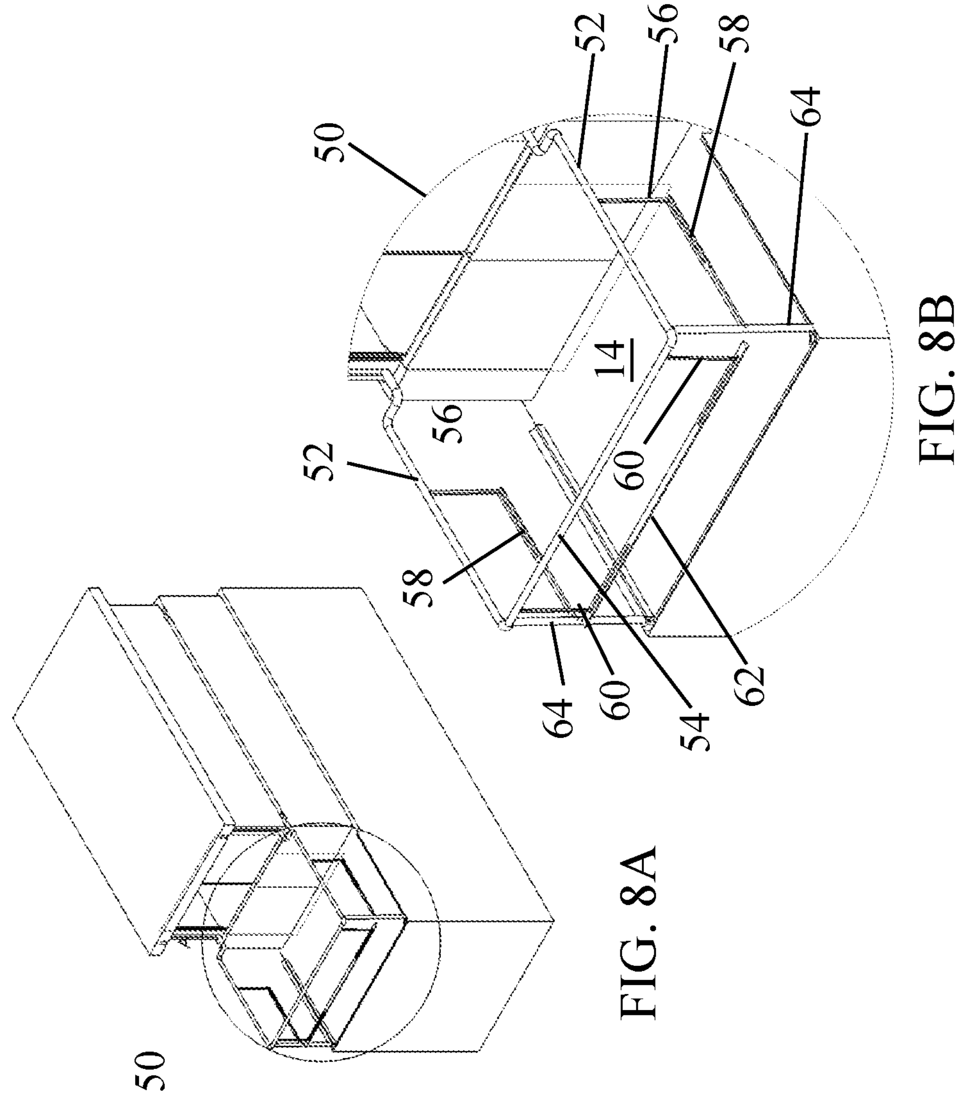
FIGS. 8A and 8B illustrates a perspective view of the expandable structure of FIG. 1, in an expanded state with a detailed view of a patio of the expandable structure.

Referring now to FIGS. 5A through 6C, the expansion of the expandable home is illustrated. In FIG. 5A, the structure is in the retracted state. In FIG. 5B, the lifting of the bottom portion is started, where the floor structure 22 is raised upward with lifting mechanisms 30. In FIG. 5B, the bottom portion is fully raised, where the floor structure 22 is in its second story position. The lower rear wall 26 is now exposed as an exterior wall instead of being nested behind the rear wall 20 (as in the retracted state of FIG. 5A). In FIG. 5D, the top portion of the second story is lifted by lifting mechanisms 32. The upper rear wall 24 is now fully exposed to the exterior and is no longer nested with the upper rear wall 26. FIGS. 6A through 6C show details of the lifting mechanism 32, where FIG. 6C is a detailed view about circle 34 of FIG. 6B.

In some embodiments, the first story 11 can have a height of 80 inches, while the second story 13 can reach a height of 85 inches. The first story 11 can boast a width of 96 inches, while the second story 13 can offer a width of 83 inches. These exemplary measurements illustrate the well-designed and versatile layout of the building's architecture FIGS. 7A through 7D illustrate an exemplary embodiment of a lifting mechanism 30. The lifting mechanism 30 can include a lead screw 40 driven by a motor (not shown). The lead screw 40 can be placed in a mount 44 and can be located in a housing 32. Guiding rods 42 may be positioned adjacent each side of the lead screw 40. A lifting adapter 46 can be configured to move along the lead screw 40 during rotation thereof. The lifting adapter 46 may be connected to the lower portion of the second story for lifting the lower portion. A similar lifting mechanism 32 may be used for lifting the upper portion of the second story, as described above.

In some embodiments, four lifting mechanisms 30 may be used to raise and lower the lower wall portion (such as lower rear wall 26) and the upper wall portion (such as the upper rear wall 24) at the same time, while four lifting mechanisms 32 may be used to raise and lower the upper wall sections (such as upper rear wall 24).

Referring now to FIGS. 8A through 10, a patio handlebar can be provided about the patio deck 14. The handlebar may automatically deploy during raising of the second story. The handlebar serves as a protective feature for the second-floor patio deck 14. In the double decker retracted state, the handlebar retracts into the patio floor's narrow space. Conversely, during the double decker expansion, it moves in unison with the second-floor top.

The patio handlebar can incorporate linkages that connect the two front supports and three lower-level handles, allowing them to retract smoothly and seamlessly into the complete handlebar structure. This unified approach ensures the handle functions as a cohesive unit, enhancing both the case of operation and the overall aesthetics of the patio area.

In some embodiments, side upper handlebars 52 can be attached to the top of the lower portion of the second story. Thus, as can be seen in FIGS. 5B and 5C, as the lower portion of the second story is raised, the side upper handlebars 52, along with the front upper handlebar 54 also raises. Side members 64 may support the upper handlebars 52, 54 at corners thereof. Side lower handlebar supports 56 may depend from the side upper handlebars and can support a side lower handlebar 58 at a distal end thereof. Similarly, front lower handlebar supports 60 can depend from the upper front handlebar 54 and a front lower handlebar 62 can be supported by a distal end of the front lower handlebar supports 60.

Figure 9:
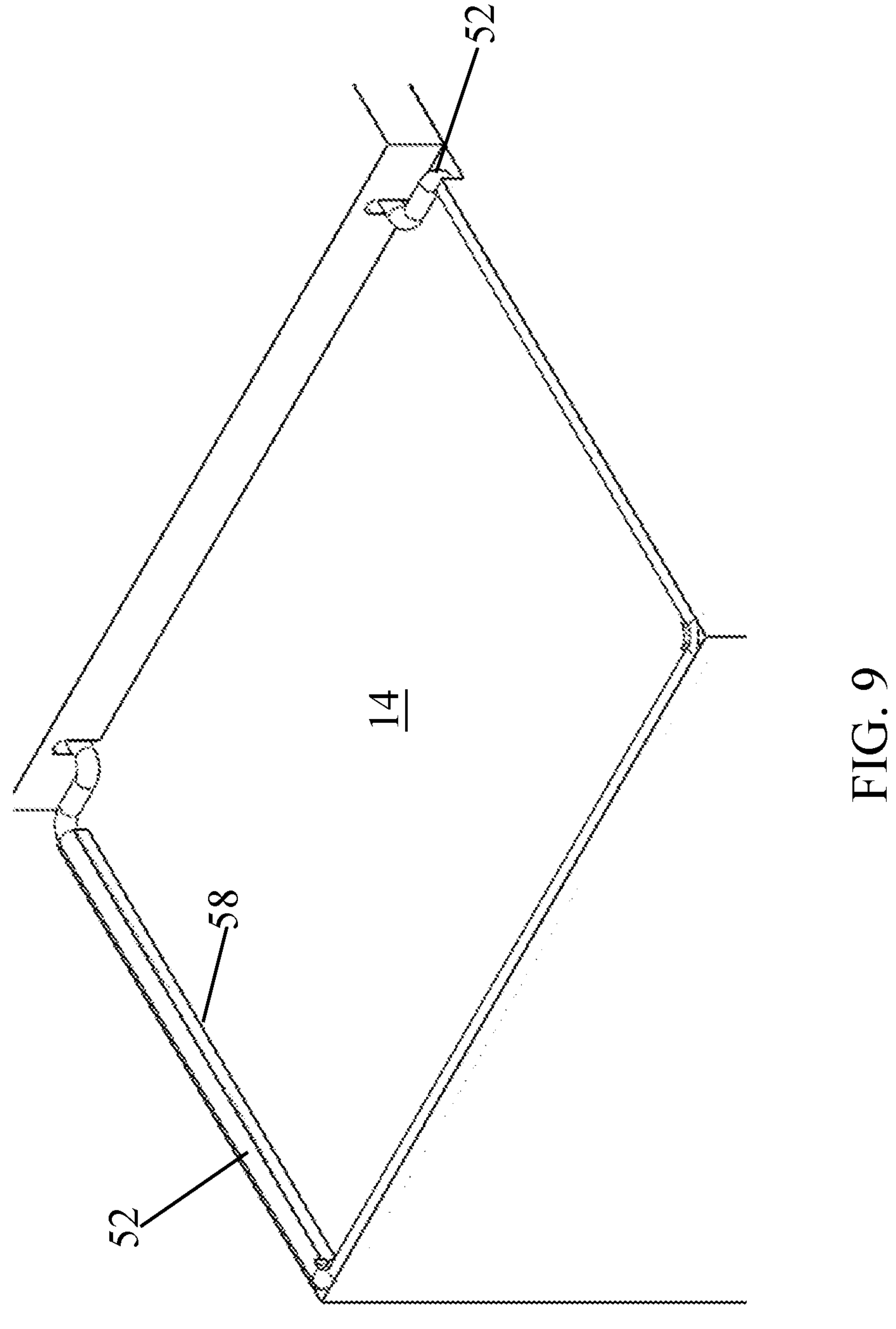
FIG. 9 illustrates a detailed view of the patio of FIG. 8B, in a closed state.
Figure 10:
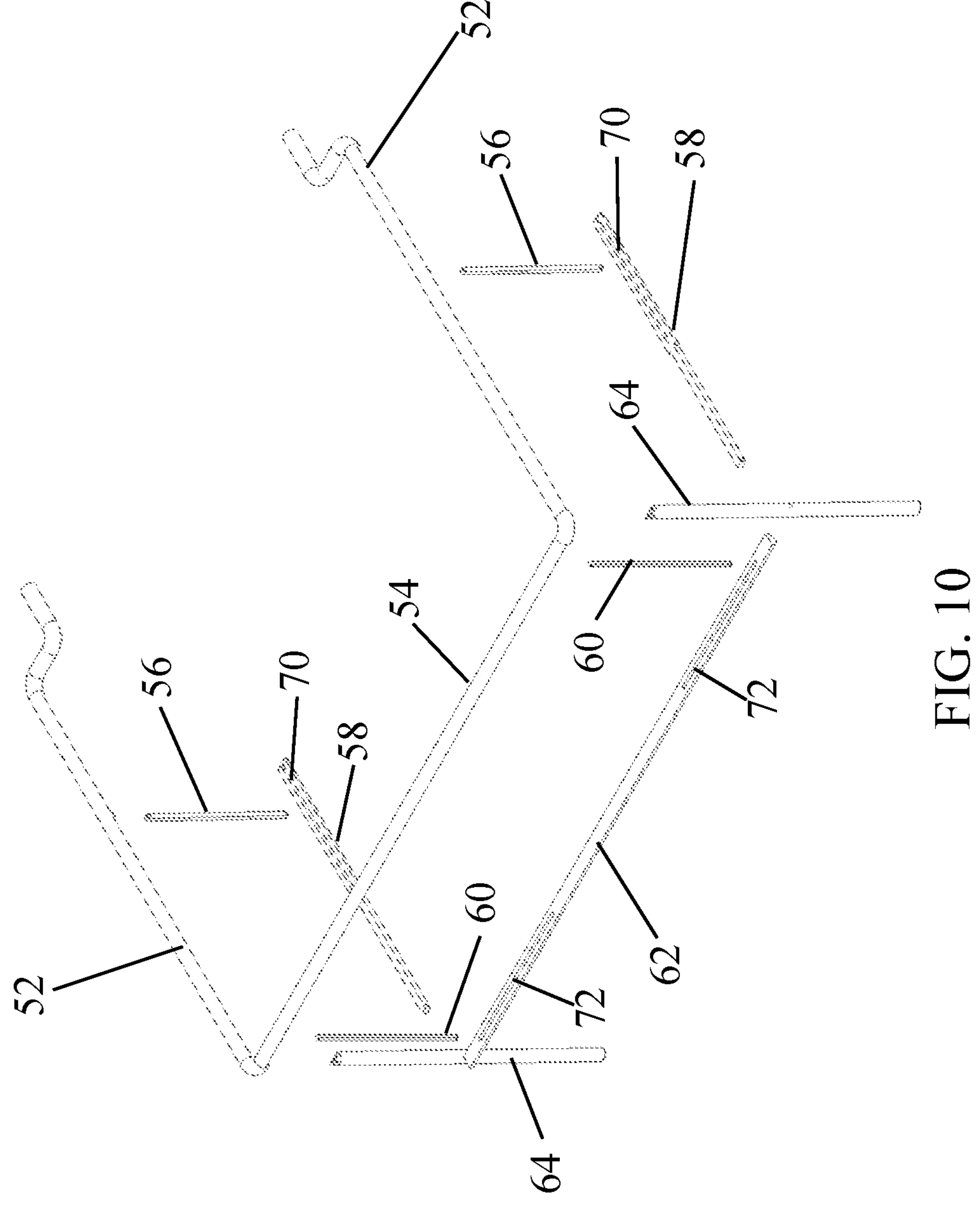
FIG. 10 illustrates a detailed view of the patio of FIG. 8B in an expanded state.

Slots 70 in the lower side handlebar 58 can be used to receive the side lower handlebar supports 56 during retraction of the second story. Slots 72 in the lower front handlebar 54 can be used to receive the front lower handlebar supports 60 during retraction of the second story. Thus, while the side members 64 may lower into the wall of the first story of the expandable structure during retraction, the handlebars may rest on the patio deck 14 when the structure is in the retracted state, as best seen in FIG. 9.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An expandable structure transformable between a collapsed state and an expanded state, the expandable structure comprising:

a main structure;

an expansion section expandable upward from at least a portion of the main structure to form a second story above a first story of the main structure, wherein:

the expansion section including a lower wall section and an upper wall section, the lower wall section nesting with the upper wall section when the expansion section is retracted, the lower wall section and the upper wall section form exterior walls of the expansion section when the expansion section is fully expanded;

a patio deck formed over a portion of the main structure, wherein the second story is adjacent the patio deck when the expandable structure is in the expanded state; and a patio handlebar disposed about an outer perimeter of the patio deck when the expandable structure is in the expanded state, wherein the patio handlebar includes an upper handlebar attached to an upper portion of the lower wall section, the upper handlebar raising from the patio deck during expansion of the lower wall section.

2. The expandable structure of claim 1, wherein the lower wall section and the upper wall section nests inside an exterior wall of the first story of the main structure.

3. The expandable structure of claim 1, wherein the patio handlebar further includes a lower handlebar disposed below the upper handlebar.

4. The expandable structure of claim 3, wherein the lower handlebar is supported by a support that hangs from the upper handlebar.

5. The expandable structure of claim 1, further comprising a second story floor structure attached to a lower wall, the second story floor structure centrally disposed in the main structure when the expandable structure is in the collapsed state.

6. The expandable structure of claim 1, further comprising a lifting mechanism operable to raise the lower wall section and the upper wall section from a collapsed position within the main structure.

7. The expandable structure of claim 6, wherein a first lifting mechanism lifts the lower wall section and the upper wall section, simultaneously, into a first raised position, where the lower wall portion forms an exterior wall of the second story, and an upper wall portion is nested inside a lower wall portion.

8. The expandable structure of claim 7, wherein a second lifting mechanism lifts the upper wall section into a second raised position, where the second wall portion forms a portion of the exterior wall of the second story.

9. The expandable structure of claim 6, wherein the lifting mechanism includes a screw that is turned to move a lifting adaptor there along.

10. An expandable structure transformable between a collapsed state and an expanded state, the expandable structure comprising:

a main structure;

an expansion section expandable upward from at least a portion of the main structure to form a second story above a first story of the main structure; and a patio deck formed over a portion of the main structure, wherein the second story is adjacent the patio deck when the expandable structure is in the expanded state, wherein:

the expansion section including a lower wall section and an upper wall section, the lower wall section nesting with the upper wall section when the expansion section is retracted, the lower wall section and the upper wall section both nesting within exterior walls of the main structure;

the lower wall section and the upper wall section form exterior walls of the expansion section when the expansion section is fully expanded and a patio handlebar disposed about an outer perimeter of the patio deck when the expandable structure is in the expanded state, wherein:

the patio handlebar includes an upper handlebar attached to an upper portion of the lower wall section, the upper handlebar raising from the patio deck during expansion of the lower wall section; and the patio handlebar includes a lower handlebar disposed below the upper handlebar.

11. The expandable structure of claim 10, further comprising a second story floor structure attached to a lower wall, wherein the second story floor structure is centrally disposed in the main structure when the expandable structure is in the collapsed state.

12. The expandable structure of claim 10, further comprising a lifting mechanism operable to raise the lower wall section and the upper wall section from a collapsed position within the main structure, wherein:

a first lifting mechanism lifts the lower wall section and the upper wall section, simultaneously, into a first raised position, where a lower wall portion forms an exterior wall of the second story, and an upper wall portion is nested inside the lower wall portion; and a second lifting mechanism lifts the upper wall section into a second raised position, where a second wall portion forms a portion of the exterior wall of the second story.

13. The expandable structure of claim 12, wherein the lifting mechanism includes a screw that is turned to move a lifting adaptor there along.

14. An expandable structure transformable between a collapsed state and an expanded state, the expandable structure comprising:

a main structure;

an expansion section expandable upward from at least a portion of the main structure to form a second story above a first story of the main structure; and a lifting mechanism operable to raise the lower wall section and the upper wall section from a collapsed position within the main structure, wherein the expansion section including a lower wall section and an upper wall section, the lower wall section nesting with the upper wall section when the expansion section is retracted, the lower wall section and the upper wall section both nesting within exterior walls of the main structure;

the lifting mechanism includes a first lifting mechanism lifts the lower wall section and the upper wall section, simultaneously, into a first raised position, where the lower wall portion forms an exterior wall of the second story, and an upper wall portion is nested inside a lower wall portion;

the lifting mechanism includes a second lifting mechanism lifts the upper wall section into a second raised position, where a second wall portion forms a portion of the exterior wall of the second story;

a patio deck formed over a portion of the main structure, wherein the second story is adjacent the patio deck when the expandable structure is in the expanded state; and a patio handlebar disposed about an outer perimeter of the patio deck when the expandable structure is in the expanded state, wherein:

the patio handlebar includes an upper handlebar attached to an upper portion of the lower wall section, the upper handlebar raising from the patio deck during expansion of the lower wall section; and the patio handlebar includes a lower handlebar disposed below the upper handlebar.

* * * * *